United States Patent [19]

Hillis et al.

[11] 4,134,967
[45] Jan. 16, 1979

[54] PROCESS FOR PREPARING ALKALI METAL MONO- AND DIBASIC PERIODATES

[75] Inventors: James E. Hillis, Angleton; William P. Coker, Lake Jackson, both of Tex.

[73] Assignee: The Dow Chemical Company, Midland, Mich.

[21] Appl. No.: 834,610

[22] Filed: Sep. 19, 1977

[51] Int. Cl.$^2$ .............................................. C01B 11/22
[52] U.S. Cl. ..................................... 423/462; 423/476
[58] Field of Search ................................ 423/462, 476

[56] References Cited

U.S. PATENT DOCUMENTS 2,989,371   6/1961   Mehltretter et al. ................. 423/476

OTHER PUBLICATIONS

"Handbook of Chem. and Physics", 43rd Ed., 1961, by C. D. Hodgman, (pub. by Chem. Rubber Pub. Co., Cleveland, Ohio), pp. 1753-1759.
"Periodic Acid and Iodic Acid and Their Salts", by G. Fred. Smith, Fifth Ed., 1950, pp. 7 and 11, pub. by G. Fred. Smith Chem. Co., Columbus, Ohio.

Primary Examiner—O. R. Vertiz
Assistant Examiner—Thomas W. Roy
Attorney, Agent, or Firm—James G. Carter

[57] ABSTRACT

Mono- and dibasic alkali metal periodates are prepared by reacting tri-, tetra- and pentabasic alkali metal periodates with a substance having a relative acidity value, pKa, of from 3 to 16 at a temperature of from 0° to 100° C at molar ratios of periodate to moles of acidic substance of 1:1 to 1:1000. The mono- and dibasic alkali metal periodates are useful in oxidizing olefins such as propylene to the corresponding oxide such as propylene oxide.

6 Claims, No Drawings

PROCESS FOR PREPARING ALKALI METAL MONO- AND DIBASIC PERIODATES

BACKGROUND OF THE INVENTION

1. Field of the Invention

This invention pertains to a process for preparing monobasic and dibasic alkali metal periodates from tribasic, tetrabasic or pentabasic alkali metal periodates.

2. Description of the Prior Art

Monobasic alkali metal periodates have been prepared by reacting tribasic alkali metal periodates with a strong mineral acid such as sulfuric acid or nitric acid.

Such strong acids result in neutral by-products such as alkali metal nitrates or alkali metal sulfates. The process of the present invention results in by-products having basic values such as alkali metal carbonates, bicarbonates or dilute caustic solutions which can be recovered and employed, if desired, in other processes requiring basic values such as, for example, precipitating magnesium hydroxide from seawater, neutralizing acidic process streams and the like.

SUMMARY OF THE INVENTION

Monobasic and dibasic alkali metal periodates are prepared by reacting tribasic, tetrabasic or pentabasic alkali metal periodates with a weak acidic substance having a relative acidic value, pKa, of from about 3 to about 16, preferably from about 6 to about 15, in a molar ratio of periodate to said substance of from about 1:1 to about 1:1000, preferably from about 1:1 to about 1:50 and most preferably from about 1:1 to about 1:2 at a temperature of from about 0°C. to about 350° C., preferably from about 20° C. to about 100° C. at a pressure of from about 1 atmosphere to about 100 atmospheres, preferably from about 1 atmosphere to about 20 atmospheres for a time sufficient to form said monobasic and/or dibasic alkali metal periodate, usually from about 0.5 min. to about 120 min., preferably from about 1 min. to about 20 minutes.

DETAILED DESCRIPTION OF THE INVENTION

Suitable tribasic alkali metal periodates which can be employed in the process of the present invention include, for example, $K_3H_2IO_6$, $Na_3H_2IO_6$, $Li_3H_2IO_6$, $Rb_3H_2I_2O_{10}$, $Na_3IO_5$, $Cs_3IO_5$ mixtures thereof and the like.

Suitable pentabasic alkali metal periodates which can be employed in the process of the present invention include, for example, $Na_5IO_6$, $K_5IO_6$, $Li_5IO_6$, $Rb_5IO_6$, $Cs_5IO_6$, mixtures thereof and the like.

Suitable weakly acidic substances having relative acidic values, pKa, of 3 to 16 which can be employed in the process of the present invention include, for example, $H_2O$, $CO_2$, $H_2CO_3$, $Na_2Cr_2O_7$, $K_2Cr_2O_7$, $WO_3$, $NaHCO_3$, $B_2O_3$, $H_3BO_4$, mixtures thereof and the like.

The following examples are illustrative of the present invention but are not to be construed as to limiting the scope thereof in any manner.

EXAMPLE 1

One gram of $Li_5IO_6$ was suspended in 50 cc of water and placed in an autoclave. After charging with 200 psig of $CO_2$ the autoclave and contents were heated to 130° C. for 6 hours. When cool, a clear, colorless solution was removed and analyzed for periodate (86% of the $I^{7+}$ charged remained). The solution pH of 7.3 combined with the $H_5IO_6$—LiOH titration curve indicates the periodate exists as a mixture of the mono- and dibasic salts.

Note: In the lithium series of periodate salts, only the mono- and dibasic salts were water soluble — thus a clear solution alone indicates reduction to a mono- or dibasic salt.

EXAMPLE 2

Five and eight-tenths grams of $Na_3H_2IO_6$ was placed in 200 ml of water and $CO_2$ was bubbled through the suspension. After about 15–20 minutes, a clear solution was obtained (pH 11). As the $CO_2$ purge was continued (300–400 g over 2–3 hours), a white precipitate formed. The final solution had a 7.5 pH and yielded 2.5 g of solids upon filtration. The infrared spectrum of this material indicated it was $Na_2H_3IO_6$.

EXAMPLE 3

Fifty grams of $KIO_3$ was ground with 4 molar equivalents of KOH and placed in a nickel beaker in an autoclave. There it was heated to 300° C. under oxygen pressure (1000 psig at 300° C.). After 14 hours at 300° C. the autoclave was cooled and the resulting material analyzed by acid and iodometric titration, infrared and Raman spectra. This indicated the product to be a mixture of the tribasic periodates $K_3H_2IO_6$ and $K_3IO_5$. When 10 g of this crude product was dissolved in 200 cc of water and $CO_2$ bubbled into the solution (room temperature, 25° C.), a white precipitate formed in 20–30 minutes (1.6 g). This analyzed as $KIO_4$ by iodometric titration for $I^{7+}$, infrared and Raman spectra. The sample was active in oxidizing propylene to 1,2-propylene oxide.

EXAMPLE 4

A. In a manner similar to Example 3, 2 g of $CsIO_3$ was ground with 4 molar equivalents of CsOH and heated in a nickel crucible in an autoclave to 310° under oxygen pressure (1000 psig at 310° C.). After 5 hours at 310° C., the autoclave was cooled and the contents analyzed as in Example 3. This indicated the product was a tribasic periodate, $Cs_3IO_5$, and excess CsOH.

A 2.5 g sample of this crude periodate was placed in 15 ml of water and $CO_2$ bubbled through the mixture (200–300 cc per minute; estimated $CO_2$ flow) for 1 hour. The resulting precipitate (0.9 g) analyzed as $CsIO_4$.

B. When 0.5 g of the $CO_2$ product in A above ($CsIO_4$) was placed on glass wool in a ⅜-inch i.d. glass tube and heated in a propylene stream (15 cc per minute), 1,2 -propylene oxide was produced between 280° and 320° C. Peak propylene conversion (28%) was observed at 312° C. with a propylene to propylene oxide selectivity of 64%.

As a comparison, when a sample of the initial cesium periodate product, $Cs_3IO_5$ was employed, no propylene oxide was produced.

EXAMPLE 5

A. A nickel crucible charged with 11.5 g of a 1:4:0.075 molar mixture of $NaIO_3$, NaOH and $CsIO_3$, respectively, was placed in an autoclave charged with oxygen for 8 hours at 300° C. Oxygen pressure at 300° was 1000 psig. The resultant product was found to be predominately $Na_3H_2IO_6$ as determined by its infrared spectrum.

B. When a mixture of propylene and $CO_2$ (1:1.2 at 8.3 cc per minute) was passed at 210° C. over a 2 g sample of the product produced in A above a substantial amount of 1,2-propylene oxide was produced in high selectivity.

C. However, when only propylene was passed over a 1.5 g sample of the product produced in A above (approximately 5 cc per minute flow) in a ⅜-inch glass reactor, between 200° and 390° C., no oxidation occurred.

EXAMPLE 6

A sample of commercial $Na_3H_2IO_6$ which failed to produce 1,2-propylene oxide from propylene below 400° C. was ground with one-half an equal molar amount of sodium dichromate in a motar and pestle. Three grams of the dried-powdered mixture was then placed in a 1-inch i.d. glass reactor and heated under a propylene flow of 15 cc per minute. Propylene oxide was produced with good selectivity between 180° C. and 245° C. which indicated conversion of the tribasic periodate to mono- and/or dibasic periodate.

EXAMPLE 7

Mixtures of commercial $Na_3H_2IO_6$ (5.9 g, 0.02 moles) with an equal molar amount of $WO_3$, $NaHCO_3$, $B_2O_3$ or a two-fold molar amount of $H_3BO_3$ were separately slurried with water, dried in a vacuum oven and ground to a fine powder. Each of these mixtures was found to produce propylene oxide when propylene was passed over them at 250° C. and 20 cc per minute in a 1-inch i.d. glass reactor.

EXAMPLE 8

An Erlenmeyer flask was charged with 100 cc of water and 2 g of $Na_3H_2IO_6$. A second flask was charged with water, boiled for 15 minutes with a $N_2$ pad and then 2 g of $Na_3H_2IO_6$ was added.

The contents of both flasks were boiled for 1 hour (the second flask under $N_2$ pad) and then cooled to room temperature. The precipitate in each flask was filtered, dried and weighed. The product was $Na_2H_3IO_6$ in both experiments and the yield was 73 and 72%, respectively.

The second experiment where a $N_2$ pad was used demonstrated that water was the acidic substance and not $CO_2$ from the atmosphere.

We claim:

1. A process for preparing an alkali metal monobasic, dibasic periodate or mixtures thereof which comprises contacting an alkali metal tribasic, tetrabasic, pentabasic periodate or mixture thereof with a substance having a relative acidic value, pKa, of from about 3 to about 16 at a temperature of from about 0° C. to about 350° C. and a pressure of from about 1 atmosphere to about 100 atmospheres for a time sufficient to form said alkali metal monobasic, dibasic periodate or mixtures thereof and wherein the molar ratio of periodate:said substance is from about 1:1 to about 1:1000.

2. The process of claim 1 wherein the temperature is from about 20° C. to about 250° C. and the pressure is from about 1 atmosphere to about 20 atmospheres and the molar ratio of periodate to said substance is from about 1:1 to about 1:50 and wherein said $pK_a$ value is from about 6 to about 15.

3. The process of claim 2 wherein said alkali metal is sodium, potassium, lithium, or rubidium or cesium.

4. The process of claim 3 wherein said tribasic or pentabasic periodate is $Cs_3IO_5$, $Li_5IO_6$, $Na_3H_2IO_6$, $Rb_3IO_5$, $Na_5IO_6$, $K_3H_2IO_6$, $K_3IO_5$ or mixture thereof.

5. The process of claim 4 wherein said substance is $CO_2$, water, $Na_2Cr_2O_7$, $WO_3$, $NaHCO_3$, $B_2O_3$, $H_3BO_3$ or mixtures thereof.

6. The process of claim 5 wherein the molar ratio of periodate to said substance is from about 1:1 to about 1:2.

* * * * *

UNITED STATES PATENT AND TRADEMARK OFFICE
CERTIFICATE OF CORRECTION

PATENT NO. : 4,134,967
DATED : January 16, 1979
INVENTOR(S) : James E. Hillis, et al It is certified that error appears in the above-identified patent and that said Letters Patent are hereby corrected as shown below:

Col. 1, line 47; insert $--Cs_3H_2IO_6,--$ before "$Rb_3H_2I_2O_{10}$,".

Signed and Sealed this

Third Day of July 1979

[SEAL]

Attest:

Attesting Officer

LUTRELLE F. PARKER
*Acting Commissioner of Patents and Trademarks*